United States Patent [19]

Funahashi et al.

[11] Patent Number: 5,761,530
[45] Date of Patent: Jun. 2, 1998

[54] APPARATUS FOR RECORDING/ REPRODUCING AND METHOD FOR TRANSMITTING THE INFORMATION FOR DISC CHANGER SYSTEM

[75] Inventors: Takeshi Funahashi, Saitama; Tomoko Shimoyama; Hitoshi Rikukawa, both of Kanagawa, all of Japan

[73] Assignee: Sony Corporation, Tokyo, Japan

[21] Appl. No.: 612,097

[22] Filed: Mar. 7, 1996

[30] Foreign Application Priority Data

Mar. 10, 1995 [JP] Japan ................... 7-051361

[51] Int. Cl.⁶ ........................................ G11B 17/22
[52] U.S. Cl. ................................. 395/835; 395/839
[58] Field of Search ........................ 395/712, 651–653, 395/200.09–200.12, 200.14, 284, 439–441, 828–839, 726–732

[56] References Cited

U.S. PATENT DOCUMENTS

| | | | |
|---|---|---|---|
| 4,495,564 | 1/1985 | Draper et al. | 364/200 |
| 4,628,445 | 12/1986 | Buonomo et al. | 364/200 |
| 4,724,521 | 2/1988 | Carron et al. | 364/300 |
| 5,036,456 | 7/1991 | Koegel | 364/200 |
| 5,170,471 | 12/1992 | Bonevento et al. | 395/275 |
| 5,237,553 | 8/1993 | Fukushima et al. | 369/58 |
| 5,257,248 | 10/1993 | Ogasawara | 369/32 |
| 5,276,662 | 1/1994 | Shaver, Jr. et al. | 369/32 |
| 5,408,624 | 4/1995 | Raasch et al. | 395/375 |
| 5,410,651 | 4/1995 | Sekizawa et al. | 395/200 |
| 5,410,703 | 4/1995 | Nilsson et al. | 395/700 |
| 5,421,009 | 5/1995 | Platt | 395/600 |
| 5,450,589 | 9/1995 | Maebayashi et al. | 395/700 |
| 5,566,351 | 10/1996 | Crittenden et al. | 395/867 |
| 5,636,188 | 6/1997 | Funahashi | 369/32 |

*Primary Examiner*—Lance Leonard Barry, Esq.
*Attorney, Agent, or Firm*—Limbach & Limbach L.L.P.; Seong-Kun Oh

[57] ABSTRACT

A recording/reproducing apparatus, such as an automatic changer for optical discs for recording/reproducing signals on or from the optical discs. The apparatus includes a unit for recording/reproducing signals on or from a recording medium, a recognition unit for recognizing the state of the recording/reproducing unit, a first interfacing unit for exchanging the information between the recording/ reproducing unit and the recognition unit, a second interfacing unit for exchanging the information between the recognition unit and a first external equipment, and a third interfacing unit, separate from the second interfacing unit, for exchanging the information between the recognition unit and the second external equipment. The information is exchanged between the recognition unit and the second external equipment by the third interfacing unit as the connection between the recognition unit and the first external equipment by the second interfacing unit is maintained. Accordingly, software upgrading is facilitated, problems with the recording/reproducing apparatus can be dealt with quickly and maintenance operations can be performed on opportune moments.

13 Claims, 10 Drawing Sheets

| BYTE-1 | STATUS | — ST |
| BYTE-2 | RESULT | — RES |
| BYTE-3 | POINTER (MSB SIDE) | — $PIT_M$ |
| BYTE-4 | POINTER (LSB SIDE) | — $PIT_L$ |

| BYTE-1 | DATA LENGTH | — DLG |
| BYTE-2 | DATA | — DT |
| BYTE-3 | DATA | — DT |
| ⋮ | ⋮ | |
| BYTE-5 | DATA | — DT |

FIG.7A

STATUS ST

| b7 | b6 | b5 | b4 | b3 | b2 | b1 | b0 |

| BIT | DEFINITION | STATUS |
|---|---|---|
| b0 | AUTO-CHANGER | 0 : BUSY<br>1 : READY |
| b1 | DRIVE DR#1 | 0 : BUSY<br>1 : READY |
| b2 | DRIVE DR#2 | 0 : BUSY<br>1 : READY |
| b3 | DRIVE DR#3 | 0 : BUSY<br>1 : READY |
| b4 | DRIVE DR#4 | 0 : BUSY<br>1 : READY |

FIG.7B

RESULT RES

| b7 | b6 | b5 | b4 | b3 | b2 | b1 | b0 |

| BIT | DEFINITION | STATUS |
|---|---|---|
| b0 | AUTO-CHANGER | 0 : NORMAL END<br>1 : ABNORMAL END |
| b1 | DRIVE DR#1 | 0 : NORMAL END<br>1 : ABNORMAL END |
| b2 | DRIVE DR#2 | 0 : NORMAL END<br>1 : ABNORMAL END |
| b3 | DRIVE DR#3 | 0 : NORMAL END<br>1 : ABNORMAL END |
| b4 | DRIVE DR#4 | 0 : NORMAL END<br>1 : ABNORMAL END |

APPARATUS FOR RECORDING/REPRODUCING AND METHOD FOR TRANSMITTING THE INFORMATION FOR DISC CHANGER SYSTEM

BACKGROUND OF THE INVENTION

This invention relates to a recording/reproducing apparatus for recording/reproducing signals on or from a recording medium and transmitting/receiving the information to or from external equipments. The invention also relates to a method for information transmission for transmitting/receiving the information to or from the external equipments.

There has hitherto been known a recording/reproducing apparatus for recording/reproducing signals on or from a recording medium, for example, a recording/reproducing apparatus for selectively taking out a recording medium, for example, from a rack housing a large number of recording media therein and for recording/reproducing signals on or from the recording medium. Among these apparatus is an automatic changer for optical discs.

FIG. 1 schematically illustrates the construction of such automatic changer for optical discs.

Referring to FIG. 1, an automatic changer 100 for an optical disc D includes a first rack 101 and a second rack 103. The first rack 101 has a large number of shelves T extending in the vertical direction and occasionally in the horizontal direction for accommodating a large number of optical discs D. The second rack 103 has plural optical disc drives 102 in the vertical direction and occasionally in the horizontal direction for recording/reproducing information signals on or from the loaded optical discs. In the embodiment shown in FIG. 1, the first and second racks 101, 103 are arrayed in the vertical direction.

The automatic changer 100 also includes a transport mechanism 104 for selectively taking out an optical disc D from a group of optical discs set on the shelves T of the first rack 101 and a transport mechanism 104 for transporting the optical disc D to the optical disc drive selected from the optical disc drives 102 within the second rack 102.

The transport mechanism 104 includes a driving unit 106 moved in a self-propelled manner along a guide rail 105 provided for extending along the vertical direction of the automatic changer 100, and an arm 107 protruded from the driving unit 106 towards the shelf T. The transport mechanism 104 also includes a disc handling portion 108 movable on the upper surface of the arm 107 in a direction towards and away from the shelf T and carrying a chuck mechanism for chucking the optical disc D at the foremost part thereof.

The driving unit 106 is electrically connected with an arm controller 109 driving or controlling the driving unit 106 via a flexible cable 110. A command signal is provided from the arm controller 109 via the flexible cable 110 to the driving unit 106 so that the driving unit 106 is moved in an up-and-down direction, while the disc handling portion 108 is moved in a direction towards and away from the shelf T.

The arm controller 109 has a system controller, that is a central processing unit or CPU for controlling the optical disc drive 102, a program ROM (read-only memory) having a stored control program and a RAM (random access memory) as a work memory. This system controller is connected with an external host computer 111 over a bus 112 of the SCSI (Small Computer Systems Interface) standard, referred to hereinafter as SCSI bus.

When detecting that the optical disc D has been introduced into a disc inlet/outlet portion 113 from outside the automatic changer 100, the host computer 111 commands the arm controller 109 to transfer the optical disc D onto the shelf. The arm controller 109 moves the optical disc D inserted into the disc inlet/outlet portion 113 to a designated shelf T in accordance with the commands from the host computer 111.

When data recording/reproduction is to be performed on or from a given optical disc D, the host computer 111 commands the arm controller 109 to move the optical disc D, using the shelf number of the shelf holding the pre-set optical disc D and the pre-set drive number (device number of the optical disc drive) as parameters.

The arm controller 109 takes out the pre-set optical disc D from the designated shelf T in accordance with the commands and the above parameters from the host computer 111 using the disc handler 108 and moves the disc to the designated optical disc drive 102. The arm controller 109 inserts the pre-set optical disc D into the pre-set optical disc drive 102 using the disc handler 108.

The optical disc drive 102 starts recording or reproduction on or from the optical disc D when recognizing that the optical disc D has been inserted therein.

When it is desired to perform for example upgrading of a control software stored in the optical disc drive 102 in a recording/reproducing apparatus employing the above-described conventional automatic optical disc changer, the conventional practice is for system maintenance personnel to visit the user employing the automatic disc changer to exchange the program ROM or to perform down-loading in the memory in the optical disc drive 102 through an RS-232C standard of SCSI standard interface. However, such software upgrading necessitates complete transient standstill by cessation of operation of the apparatus. For cessation of the operation of the apparatus, negotiations must be had between the systems maintenance personnel and the user as to the date on which to undertake such compete cessation of the operation, thus seriously inconveniencing the user especially if the service station is located at a remote place.

Similarly, if a trouble has occurred while the automatic optical disc changer is being used by the user, the customary practice is for the user to communicate with the system maintenance office to call systems maintenance personnel. If such trouble has occurred, the following three problems arise. First, the state of the trouble can hardly be maintained until the systems maintenance personnel arrives at the user. For example, on power down of the automatic disc changer, the same state of trouble cannot be produced when the systems maintenance personnel arrives at the user thus disabling the repair. In addition, if a trouble has occurred in the automatic disc changer, the disc changer is disconnected from the host computer and connected to a test computer. However, it is difficult to disconnect the host computer and to turn on the test computer without turning off the power of the automatic disc changer. Second, there are occasions wherein, depending upon the contents of the trouble, the software designer, for example, has to rewrite part of the software temporarily to analyze the cause of the trouble. However, this method can hardly be executed by the system maintenance personnel. Third, it is extremely difficult for the user to communicate the contents of the problem to the system maintenance office.

In addition, in a recording/reproducing apparatus employing an automatic changer for optical discs, periodic maintenance is necessary to perform on the automatic disc changer. In such case, the systems maintenance personnel periodically visit the user for maintenance operations. However, these maintenance operations, are extremely difficult to perform on opportune moments.

SUMMARY OF THE INVENTION

It is therefore an object of the present invention to provide a recording/reproducing apparatus and a transmission method whereby software upgrading may be facilitated, problems be coped with quickly and appropriately and maintenance operations can be performed on opportune moments.

In one aspect, the present invention provides a recording/reproducing apparatus including means for recording/reproducing signals on or from a recording medium, recognition means for recognizing the state of the recording/reproducing means, first interfacing means for exchanging the information between the recording/reproducing means and the recognition means, second interfacing means for exchanging the information between the recognition means and a first external equipment, and third interfacing means, separate from the second interfacing means, for exchanging the information between the recognition means and the second external equipment. The information is exchanged between the recognition means and the second external equipment by the third interfacing means as the connection between the recognition means and the first external equipment by the second interfacing means is maintained. The third interfacing means employs a modem and a communication network, as an example. The recording/reproducing apparatus further includes first holding means for holding plural recording media, second holding means for holding plural recording/reproducing means and transporting means for taking out one of the recording media from the first holding means based upon a control signal transmitted via the second or third interfacing means for transporting the recording medium to one of the recording/reproducing means in the second holding means.

In another aspect, the present invention provides a transmission method including a first step of receiving a transmission request command inquiring as to whether or not the transmission from a second external equipment can be accepted in a state enabling information exchange with a first external equipment, a second step of transmitting to the second external equipment a transmission permission status responsive to the transmission request command of the first step, for advising whether or not the transmission is acceptable, a third step of receiving a control command transmitted from the second external equipment responsive to the transmission permission status indicating that the transmission in the second step is acceptable, a fourth step of processing in accordance with the control command received in the third step, a fifth step of receiving a transmission request command after the fourth step inquiring as to whether or not transmission from the second external equipment is acceptable, and a sixth step of transmitting to the second external equipment a transmission permission status responsive to the transmission request command of the fifth step for advising whether or not the transmission is acceptable. The information exchange with the second external equipment is performed using a modem and a communication network, as an example.

With the recording/reproducing apparatus of the present invention, since the connection between the recognition means by the second interfacing means and the first external equipment is maintained even when the information is exchanged by the second interface between the recognition means and the second external equipment, it becomes possible to avoid an inconvenience otherwise produced by disconnecting the second interface and the recognition means from each other. Since the modem and the communication network are employed for the second external equipment, it becomes possible to transmit/receive the information to or from a remote place.

With the transmission method of the present invention, since the exchange of the information with the first external equipment is enabled even during information exchange with the second external equipment, it becomes possible to avoid an inconvenience otherwise produced by disconnecting the second interface and the recognition means from each other. Since the modem and the communication network are employed for information exchange with the second external equipment, it becomes possible to transmit/receive the information to or from a remote place.

Since the information exchange with the first external equipment is possible even during information exchange with the second external equipment, software upgrading may be facilitated. In addition, operational problems can be dealt with easily and promptly, while the maintenance operations may be carried out at opportune moments.

BRIEF DESCRIPTION OF THE DRAWINGS

FIGS. 6A to 7B illustrate status types.

FIGS. 7A and 7B illustrate the status and the result.

DETAILED DESCRIPTION OF THE PREFERRED EMBODIMENT

Figure 1:
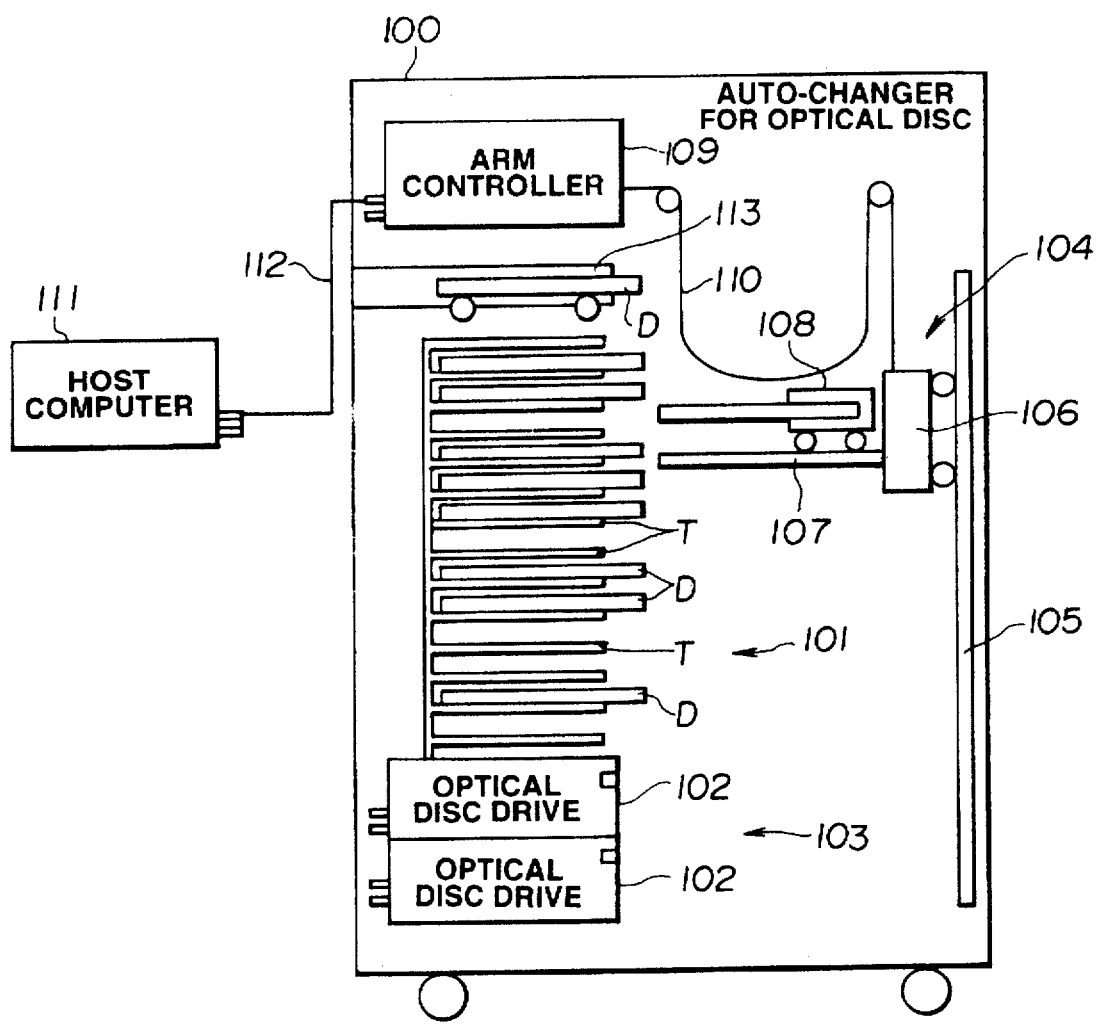
FIG. 1 shows an overall construction of a conventional recording/reproducing apparatus.

Referring to the drawings, a preferred illustrative embodiment of the present invention is explained in detail.

In the present embodiment, a modem is connected to a recording/reproducing apparatus employing an automatic disc changer for optical discs so that software upgrading, quick and appropriate elimination of problems and timely maintenance operations can be performed through this modem for overcoming the various inconveniences as discussed in connection with the conventional system. In view of the recent development in the various networks, connection of a modem to an automatic disc changer may be envisioned readily. However, it cannot be understood based on simple connection of the modem to the automatic disc changer for optical discs what sort of the connection exists between the automatic disc changer for optical discs and the host computer. Thus, software downloading for problem elimination directly by remote controlled operations tends to raise other new problems. If the user is an overseas user, tremendous costs are incurred as a result of exploiting international networks. If softwares needs be rewritten for plural optical disc drives loaded on the automatic disc changer, it may be feared that communication costs will be increased correspondingly.

In the instant embodiment, such problem is dealt with by connecting a modem to the automatic changer for optical discs and simultaneously by employing the following construction and transmission method.

Figure 2:
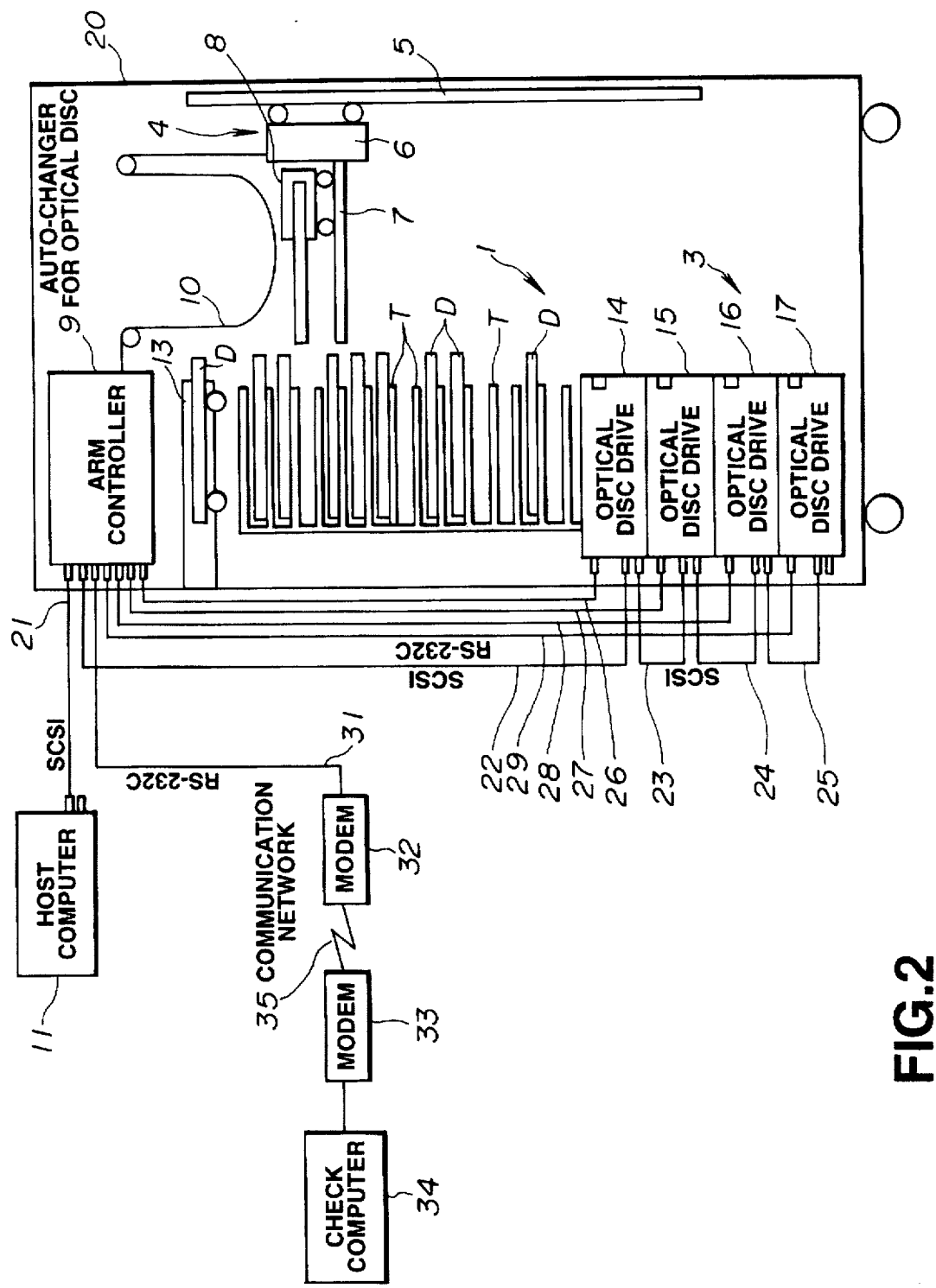
FIG. 2 shows an overall construction of a recording/reproducing apparatus embodying the present invention.

FIG. 2 shows a construction of an automatic changer for optical discs according to a preferred embodiment of the present invention.

Referring to FIG. 2, the automatic changer for optical discs 20 includes a first rack 1 as first holding means, and a second rack 3 as second holding means. The first rack 1 has a large number of shelves T extending in the vertical direction and occasionally in the horizontal direction for accommodating a large number of optical discs D. The second rack 3 has plural optical disc drives in the vertical direction and occasionally in the horizontal direction for recording/reproducing information signals on or from the loaded optical discs. In the embodiment shown in FIG. 2, only four optical disc drives 14 to 17 are shown for simplifying the illustration. The first and second racks 1, 3 are arrayed in the vertical direction. In the embodiment of FIG. 2, the number of tiers of the shelves T is set to 13. However, this is merely illustrative and a larger number of tiers than 13 may, of course, be employed.

The automatic changer for optical discs 20 also includes a transporting mechanism 4 for selectively taking out one of the optical discs D held on a large number of shelves T of the first rack 1 and for transporting the optical disc D to one of the disc drives selected from the plural optical disc drives contained in the second rack 3.

The transporting mechanism 4 includes a driving unit 6 moved in a self-propelled fashion along a guide rail 5 extended in the vertical direction of the automatic changer for optical discs 20, and an arm section 7 provided for extending from the driving unit 6 towards the shelf T. The transporting mechanism 4 also includes a disc handling unit 8 adapted for being moved on the upper surface of the arm 7 in a direction towards and away from the shelf T and carrying a chuck unit at distal end thereof for checking the optical disc D.

The driving unit 6 is electrically connected to an arm controller 9 adapted for driving the driving unit 6 via e.g., a flexible cable 10. When fed with a command signal from the arm controller 9 via a flexible cable 10, the driving unit 6 is moved vertically, while the disc handling unit 8 is moved in a direction towards and away from the shelf T.

The arm controller 9 is connected via a bus of the SCSI (Small Computer Systems Interface) standard 21, referred to hereinafter as SCSI bus, with a host computer 11 as an externally mounted first external equipment.

When the host computer 11 recognizes that a pre-set optical disc D has been inserted from outside the automatic changer into a disc input/output unit 13, the host computer commands the arm controller 9 to transfer the optical disc D onto the shelf. The arm controller 9 shifts the optical disc D inserted into the disc input/output unit 13, onto the designated shelf T in accordance with the command from the host computer 11.

On the other hand, when recording/reproducing data on or from an optical disc D, the host computer 11 instructs the arm controller 9 to move the optical disc D with the shelf number of the shelf holding the optical disc D and a pre-set drive number, that is the device number of the associated optical disc drive, as parameters.

The arm controller 9 pulls out the pre-set disc D from the designated shelf T in accordance with the commands with accompanying parameters from the host computer 11, using the disc handling unit 8, and moves the optical disc D to the designated optical disc drive. The arm controller 9 causes the pre-set optical disc D to be introduced into the designated optical disc drive 2, using the disc handling unit 8.

On recognition of insertion of the optical disc D, the optical disc drive 2 starts recording/reproduction on or from the optical disc D in accordance with commands from the host computer The host computer 11 and the arm controller 9 within the automatic changer 20 are interconnected by SCCI bus 21 as second interfacing means, while the arm controller 9 and the optical disc drives 14 to 17 are interconnected by SCSI buses 22 to 25 in a daisy-chain fashion, as explained previously. The arm controller 9 within the automatic changer 20 is connected with a modem 32 by an RS-232C standard bus (RS-232C bus) 31 as third interfacing means. In addition, the arm controller 9 and the optical disc drive 14 are interconnected by an RS-232C bus 26, while the arm controller 9 and the optical disc drive 15 are interconnected by an RS-232C bus 27. In a similar manner, the arm controller 9 is interconnected with the optical disc drives 16 and 17 by RS-232C buses 28 and 29, respectively. The RSCI buses 26 to 29 operate as first interfaceing means.

The modem 32 is connected via a communications network 35 to a modem 33 to which is connected a check computer 34.

Figure 3:
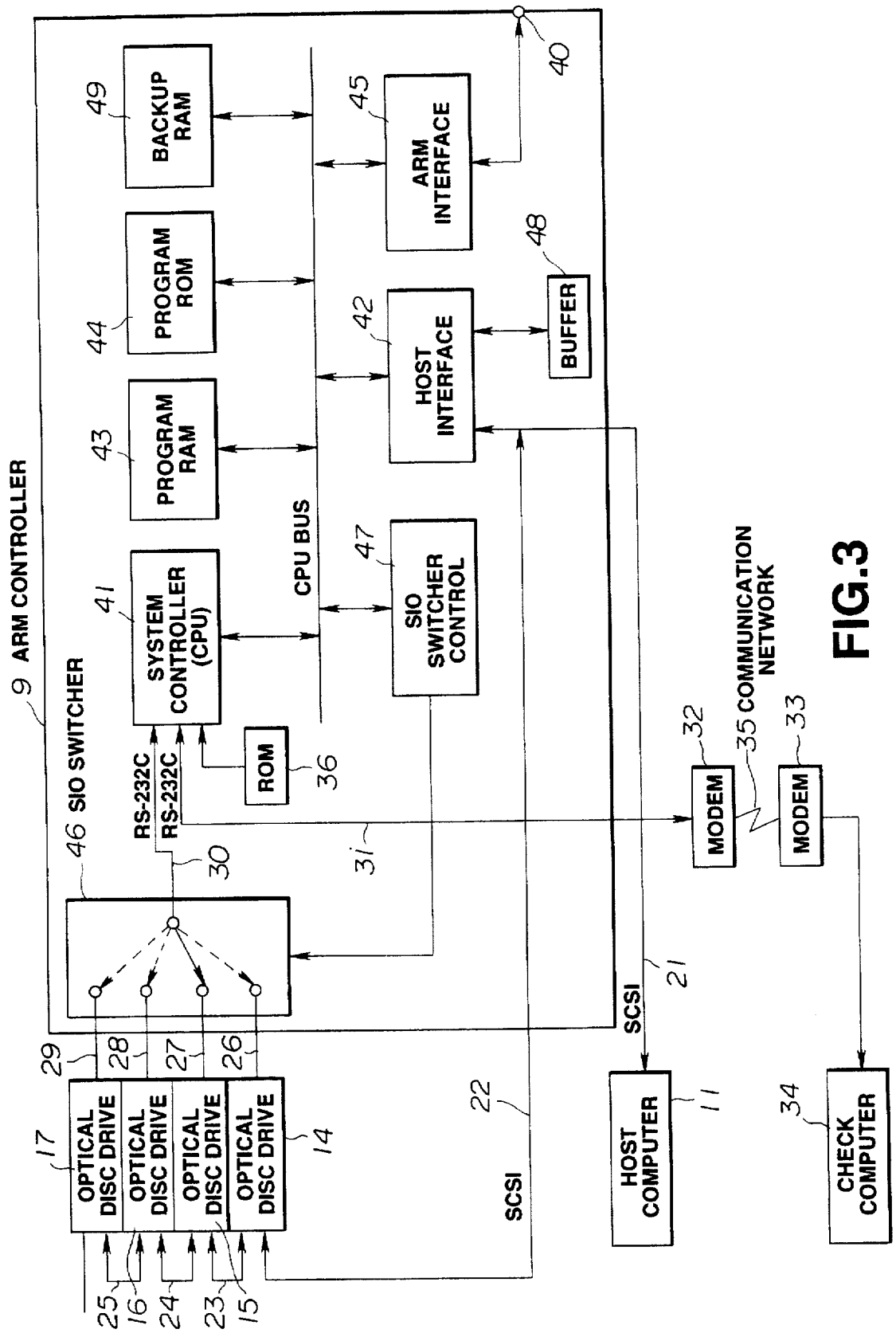
FIG. 3 shows the construction of an arm controller in an automatic disc changer shown in FIG. 2 and the manner of interconnection between the arm controller, optical disc drives and a check computer.

FIG. 3 shows a schematic arrangement of the arm controller 9 and the hardware interconnection between the arm controller 9 on the one hand and the optical disc drives 14 to 17, host computer 11 and the check computer 34 via modem 32, communication network 35 and modem 33, on the other hand.

The arm controller 9 includes an arm interfacing circuit 45, a program ROM 44, a program RAM 43, a host interfacing circuit 42, a buffer 48, a serial input/output (SIO) switcher 46, an SIO switcher control circuit 47, a backup RAM 49 and a system controller 41.

The arm controller 9 holds sequence program data for driving and controlling the driving unit 6 of the transporting mechanism 4 of FIG. 2, and a variety of program data for controlling various components within the arm controller 9. The program RAM 43 is used as an operation area for the program data read out from the program ROM 44. The arm interfacing circuit 45 provides for interfacing with the transporting mechanism 4 of FIG. 2 via a terminal 40, while the host interfacing circuit 43 constitutes second interfacing means over the second SCSI bus 21 and provides for interfacing between the external host computer 11 and the arm controller 9. The buffer 48 is provided as transmission information storage means for transiently storing data at the time of data exchange with the host computer 11 via the host interfacing circuit 42. The backup RAM 49, to which is annexed a timepiece, is provided as operating process information holding means for storing the operation process information, such as the number of times of operations of the transporting mechanism 4 of FIG. 2, the number of times of ejection/injection of the optical discs D into or from the optical disc drives 14 to 17, the number of times of injection/ejection of the optical discs D in or from the optical disc inlet/outlet 13 or the illumination time of the laser oscillator of the optical pickup units of the optical disc drives 14 to 17.

These component parts are connected with the system controller 41 comprised of a central processing unit (CPU) over a CPU bus within the arm controller 9 so as to be controlled by the system controller 41.

The system controller 41 has two RS-232C buses 30, 31, one 31 of which is connected to the modem 32 and the other 30 of which is connected to a common terminal of the SIO switcher 46.

With the system controller 41, only one of the plural I/O ports, herein the SCSI bus 21 or the RS-232 bus 31, is activated by polling. The controlling method is explained in our co-pending U.S. application Ser. No. 341,486, filed on November 11, 1994 now issued as U.S. Pat. No. 5,636,188 on Jun. 3, 1997. With this system, termed a storage filing system (SFS), the system software is stored in the program ROM 44. With the SFS loaded on the arm controller 9, data or commands transmitted under different protocols, such as SCSI or RS-232C, can be uniquely treated by the system controller 41. For example, the write command for the optical disc drive 17 from the host computer 11 and the write command transmitted from the check computer 34 over the modems 32, 33 and the communication network 35 are treated as being the same command within the system controller 41.

This SIO switcher 46 has its input terminals associated with the optical disc drives 14 to 17 such that one of the RS-232C buses 26 to 29 respectively associated with the optical disc drives 14 to 17 may be connected to the RS-232C bus 30 connecting to the system controller 41.

Figure 4:
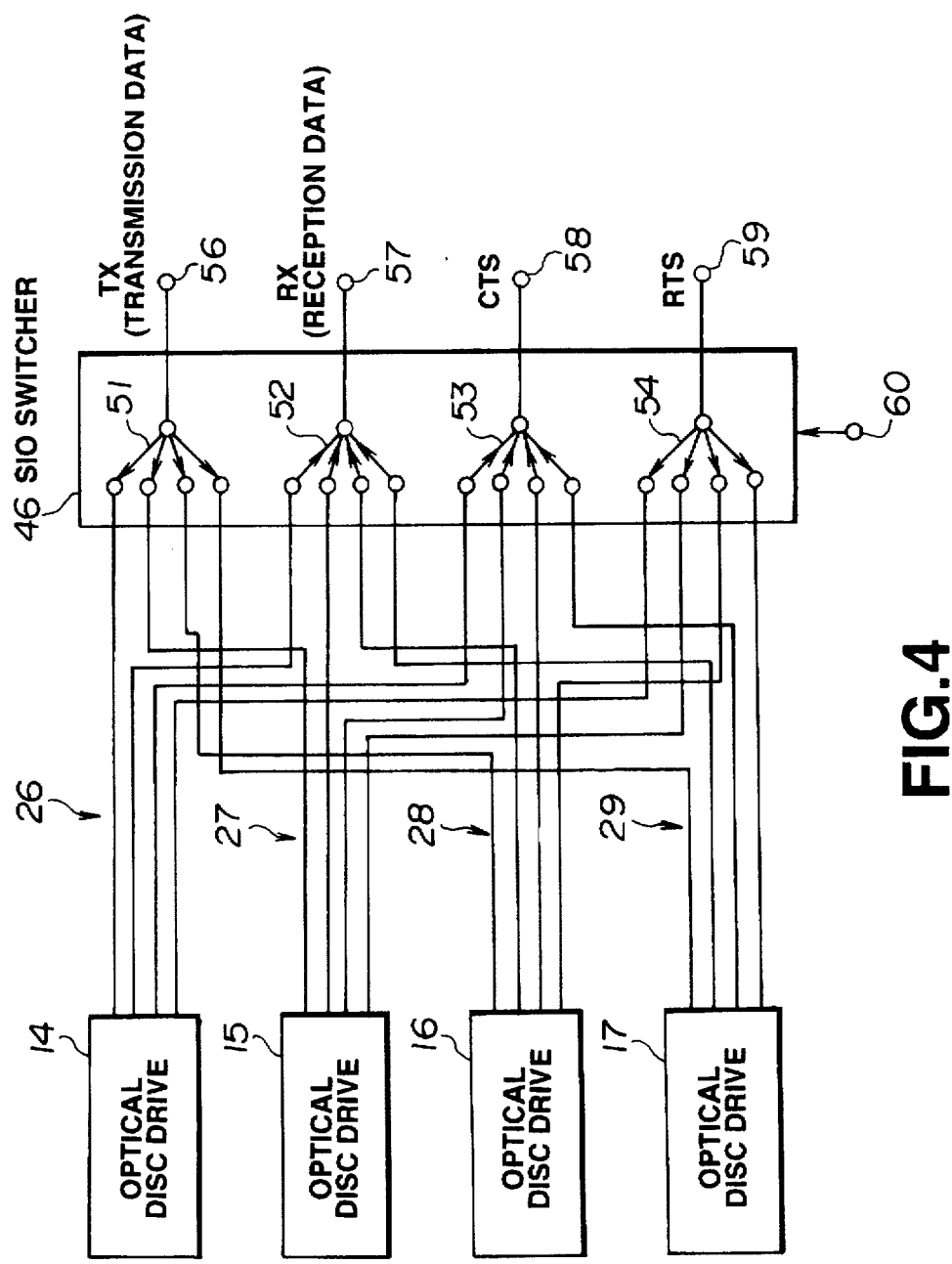
FIG. 4 shows the manner of connection between the construction of an SIO switcher and the optical disc drives.

Specifically, the SIO switcher 46 is configured as shown in FIG. 4. That is, the SIO switcher 46 has a switch 51 for selectively sending transmission data TX transmitted from the system controller 41 to the optical disc drives 14 to 17, and a switch 52 for selectively sending the reception data RX from the optical disc drives 14 to 17 to the system controller 41. The SIO switcher 46 also has a switch 53 for selectively sending a clear-to-send status (CTS), that is, a transmission permission status, from the optical disc drives 14 to 17 to the system controller 41 and a switch 54 for sending a request-to-send command (RTS), that is a reception request command, from the system controller 41 to the optical disc drives 14 to 17. One of these switches 51 to 54 is selectively activated by a switching control signal supplied from the SIO switcher control circuit 47 via a terminal 60. The transmission data TX from the system controller 41 is sent via a terminal 56 to the common terminal of the switch 51, while the reception data RX is sent via a terminal 57 connected to the common terminal of the switch 52 to the system controller 41. The transmission permission status is sent via a terminal 58 to the system controller 41. The transmission permission command from the system controller 41 is sent via a terminal 59 to the common terminal of the switch 54. The input terminals of the switches 51 to 54 are connected to the RS-232C buses 26 to 29 connecting to the optical disc drives 14 to 17.

The SCO switch 46 has the function of transmitting the transmission data TX simultaneously to the optical disc drives 14 to 17, that is connecting the transmission data TX to these optical disc drives, in addition to the function of connecting the system controller 41 to one of the optical disc drives 14 to 17.

Figure 8:
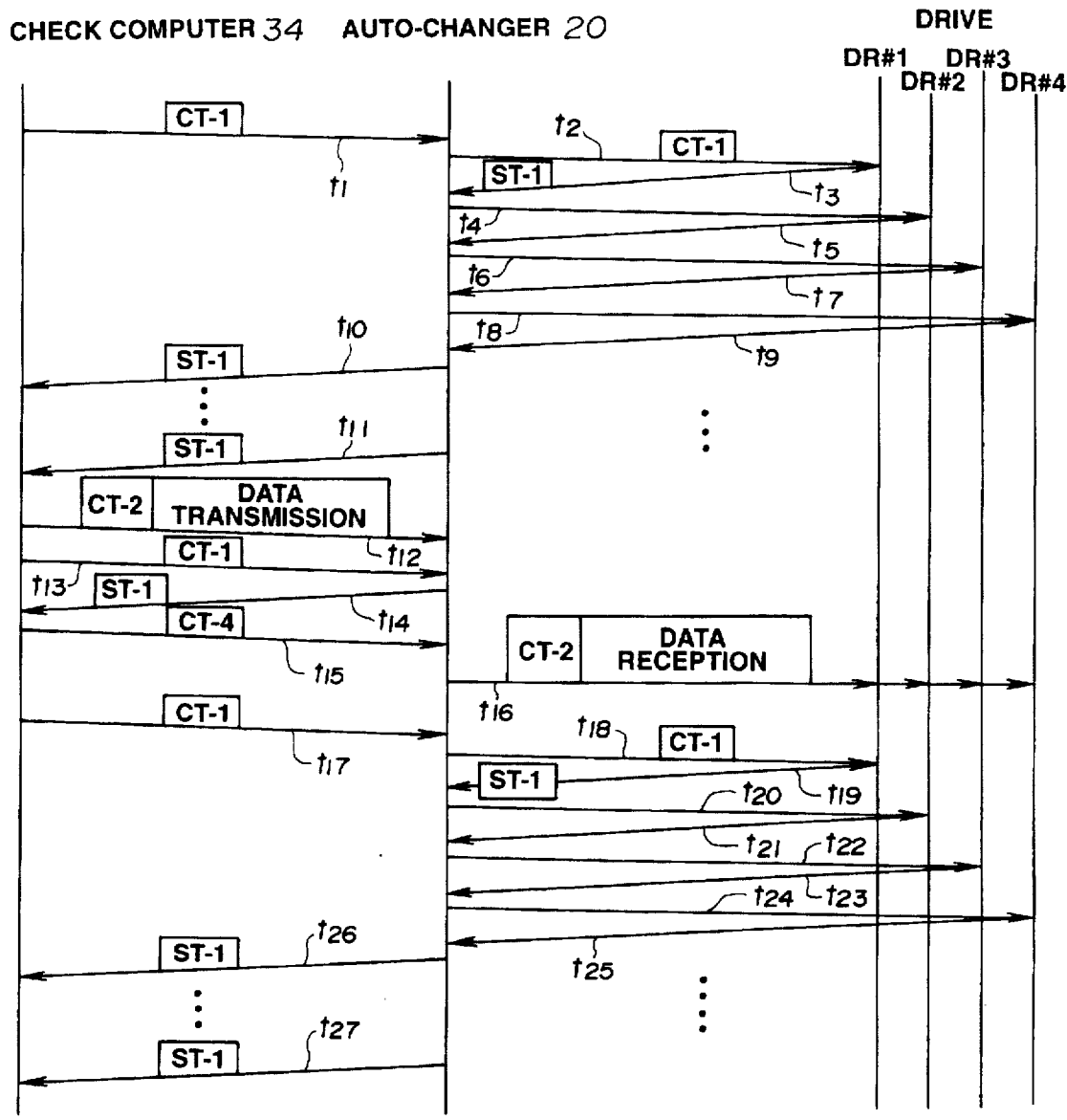
FIG. 8 illustrates the communication protocol for firmware data transmission.
Figure 9:
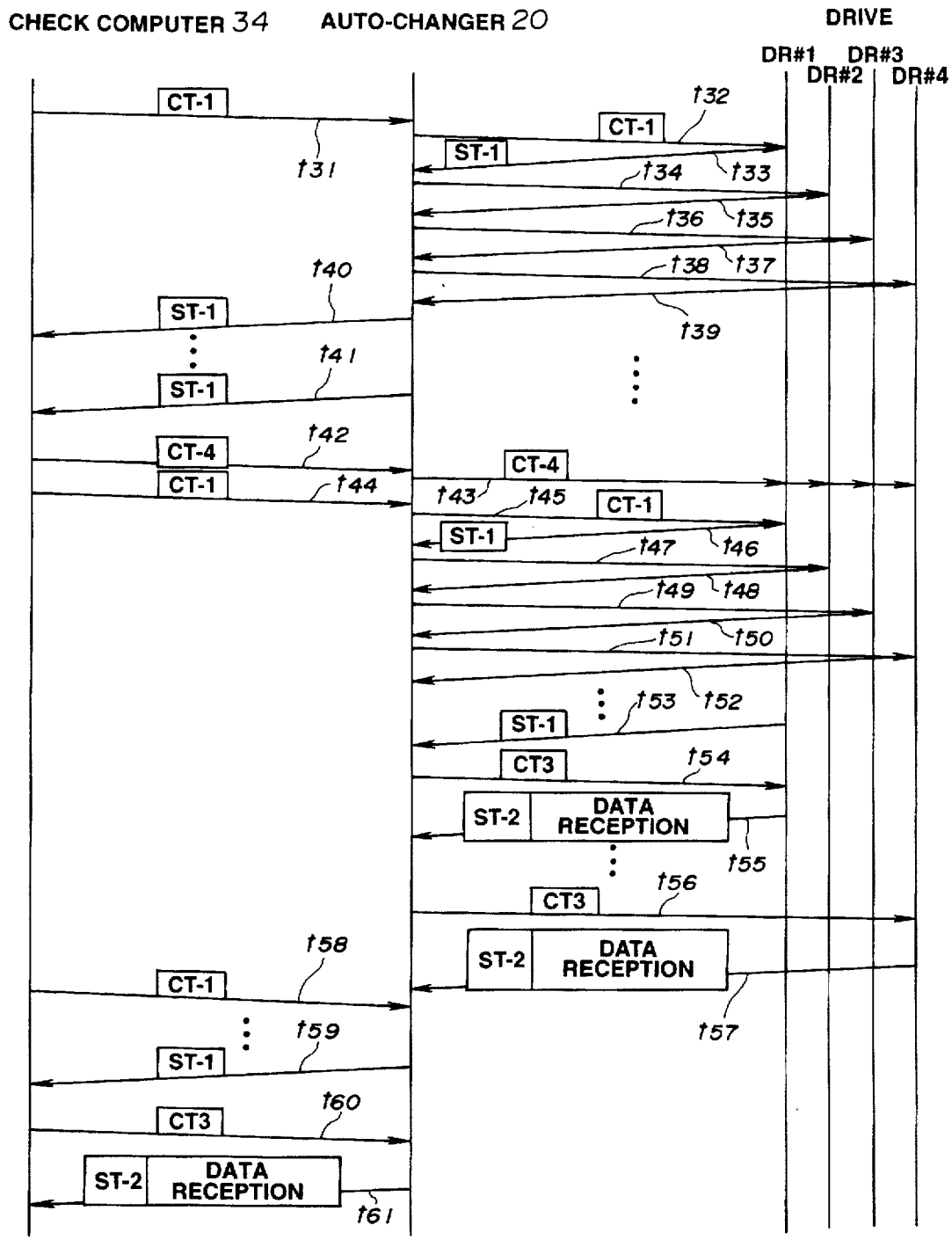
FIG. 9 illustrates communication protocol for reception of data for results of execution of diagnostic commands.

FIGS. 5 to 7 show the commands and statuses exchanged between the system controller 41 of the arm controller 9 and the optical disc drives 14 to 17 over the RS-232C bus 30 and between the system controller 41 with the modem 32 over the RS-232C bus 31, that is between the modem 32 and the check computer 34 via the communication network 35 and the modem 33. FIGS. 8 and 9 show the communication protocol between the system controller 41 and the optical disc drives 14 to 17 or the check computer 34 with the aid of the above commands and statuses.

Figure 5A:
FIGS. 5A to 5D illustrate command types.
Figure 5B:
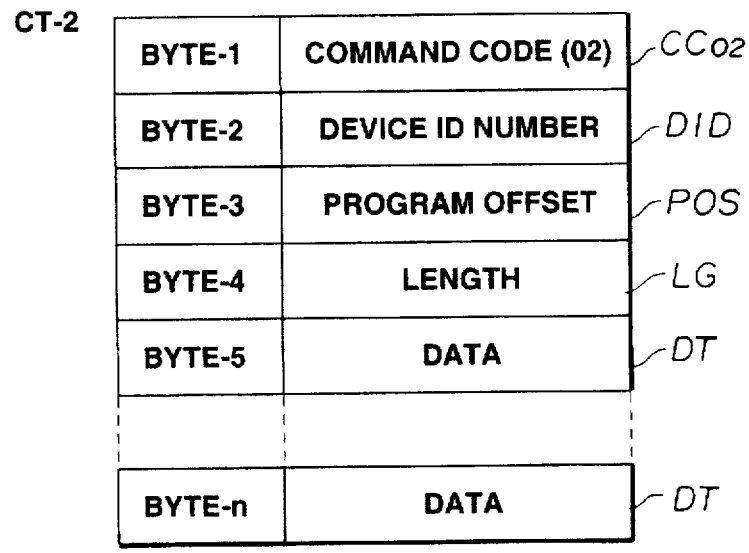
Figure 5C:
Figure 5D:
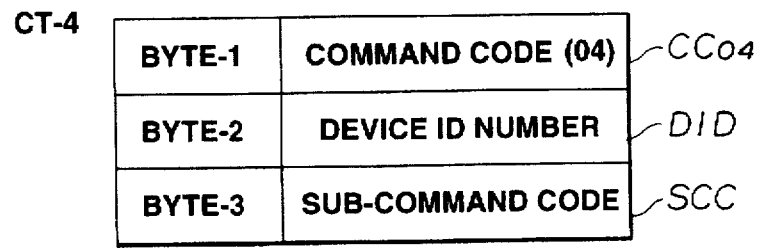

The command types employed between the automatic changer 20 and the check computer 34 and between the arm controller 9 of the automatic changer 20 and the optical disc drives 14 to 17 include a command type CT-1 inquiring whether or not a command, as a transmission request command, is acceptable, a command type CT-2 comprised of a command followed by transmission data TX, a command type CT-3 accepting the reception data RX, and an execution command type CT-4. The command types CT-2, CT-3 and CT-4 represent control commands. The command type CT-1 consists of one-byte command code (COMMAND CODE (01))$CC_{01}$, as shown in FIG. 5A. The command type CT-2 is composed of a one-byte command code (COMMAND CODE (02)) $CC_{02}$, followed by transmission data TX, each comprised of one byte of a device identification number (DEVICE ID) DID, program offset address POS and length LG, and by plural bytes of data (DATA) DT, as shown in FIG. 5B. The command type CT-3 is composed of a one-byte command code (COMMAND CODE (03)) $CC_{03}$, as shown in FIG. 5C. The command type CT-4 is composed of a one-byte command code (COMMAND CODE (04)) $CC_{04}$, each followed by one byte of a device identification number (DEVICE ID) DID and a sub-commands code SCC, as shown in FIG. 5D. The numbers 0 to 5 of the device identification numbers DID indicate the automatic changer, drive DR#1, such as the optical disc drive 14, drive DR#2, such as the optical disc drive 15, drive DR#3, such as the optical disc drive 16, drive DR#4, such as the optical disc drive 17 and the totality of drives, that is the optical disc drives 14 to 17.

The status types employed between the automatic changer 20 and the check computer 34 and between the arm controller 9 of the automatic changer 20 and the optical disc drives 14 to 17 include a status type ST-1 specifying whether or not the command as the transmission permission status is acceptable, and a status type ST-2 comprised of the status followed by the reception data RX. The status type ST-1 is comprised of each one byte of status (STATUS) ST, a result RES, an MSB side pointer PITM and an LSB side pointer PITL. The status type ST-2 is composed of a one-byte data length DLG and plural bytes of data DT, as reception data RX, as shown in FIG. 6A. The status ST is comprised of eight bits of b0 to b7, as shown in FIG. 7A. Of these, the bit b0 is "1" and "0" if the automatic changer is ready or busy, respectively, the bit b1 is "1" and "0" if the drive DR#1 for the optical disc drive 14 is ready or busy, respectively, the bit b2 is "1" and "0" if the drive DR#2 for the optical disc drive 15 is ready or busy, respectively, the bit b3 is "1" and "0" if the drive DR#3 for the optical disc drive 16 is ready or busy, respectively, and the bit b4 is "1" and "0" if the drive DR#4 for the optical disc drive 17 is ready or busy, respectively. The result RES is similarly comprised of eight bits of b0 to b7, as shown in FIG. 7B. Of these, the bit b0 is "1" or "0" if the command of the automatic changer has been terminated normally or abnormally, respectively, the bit b1 is "1" or "0" if the command of the disc drive #1 (optical disc drive 14) has been terminated normally or abnormally, respectively, the bit b2 is "1" or "0" if the command of the disc drive #2 (optical disc drive 15) has been terminated normally or abnormally, respectively, the bit b3 is "1" or "0" if the command of the disc drive #3 (optical disc drive 16) has been terminated normally or abnormally, respectively, and the bit b4 is "1" or "0" if the command of the disc drive #4 (optical disc drive 17) has been terminated normally or abnormally, respectively.

Referring to FIGS. 5 to 7, the operation of the recording/reproducing apparatus embodying the present invention will be explained in detail.

In the recording/reproducing apparatus of the present embodiment, the operation of transmitting firmware data from the check computer 34 for downloading to all of the optical disc drives 14 to 17 of the automatic disc changer 20 is explained with the aid of a communication protocol of FIG. 8. The main objective of such downloading the firmware data is to download a test program for releasing a new version or trouble analyses, only by way of examples. In the following description, the modems 23, 33 and the automatic changer 20 are collectively referred to as a network. In addition, the network is connected or disconnected when the check computer 34 is connected to the automatic changer 20 via the network or the connection between the check computer 34 and the automatic changer 20 is interrupted, respectively.

Referring to FIG. 18, the network is connected, and the command type CT-1 is outputted from the check computer 34, as indicated by a transfer operation, T1. As shown by the arrow, this command type CT-1 being sent via the network to the arm controller 9 of the automatic changer 20. It should be noted that the arm controller 9 accepts this command type CT-1 only when it is not exchanging commands or data with the host computer 11, that is when the arm controller is waiting for commands. If the arm controller 9 is receiving data or commands from the host computer 11, the arm controller sends status ST-1 specifying the busy state and, at a time point when the task by the host computer is opened, it transmits the status type ST-1 specifying the ready state to the check computer 34. Also, the firmware from the check computer 34 is down-loaded for the optical disc drives 14 to 17 not exchanging data with the host computer 11 under control by the arm controller 39. These judgments are executed by the check computer 34 checking the contents of the status type ST-1 transmitted from the arm controller 39. Meanwhile, in the arm controller 9, it is the system controller 41 that exchanges commands and statuses with the optical disc drives 14 to 17 and the check computer 34.

The objective of the command type CT-1 is to confirm whether or not the automatic changer 20 and the optical disc drives 14 to 17 are able to accept the command. Thus, on reception of the command, the arm controller 9 of the automatic changer 20 transfers the command of the command type CT-1 to the optical disc drive 14 associated with the drive DR#1 as indicated by transfer operation t2 as indicated by the arrow. On reception of this command, the optical disc drive 14 responds to the arm controller 9 by entraining its own current state on the status type ST-1, as indicated by transfer operation t3 shown by the arrow. The arm controller 9 similarly transmits the command of the command type CT-1 to the optical disc drives 15 to 17 associated respectively with the drives DR#2 to DR#4, as indicated by transfer operations t4, t6 and t8 as shown by the arrow. On reception of the command, the optical disc drives 15 to 17 respond to the arm controller 9 by entraining their own current states on the status type ST-1, as indicated by transfer operations t5, t7 and t9 as shown by the arrow. On reception of the status type ST-1 from the optical disc drives 14 to 17, the arm controller 9 of the automatic changer 20 responds to the check computer 34 by entraining its own state and the states of the optical disc drives 14 to 17 on the status type ST-1.

The check computer 34 checks the status ST of the status types ST-1 sent over the network from the automatic changer 20. If the computer 34 confirms that the optical disc drives 14 to 17 are all ready, the check computer 34 sends the command type CT-2 to the arm controller 9 of the automatic changer 20 over the network, as indicated by transfer operation t12. In this case, the device identification number DID in the command type CT-2 is the number 5 specifying all optical drives. That is, the check computer 34 transmits the command type CT-2 comprised of the command code $CC_{o2}$ followed by the device identification number DID, program offset address POS as firmware data, length LG and data DT, as shown in FIG. 5B. This command is sent over the network to the arm controller 9.

The command type CT-2, thus supplied to the arm controller 9 of the automatic changer 20, is transiently stored in the buffer 48.

The check computer 34 again outputs the command type CT-1 to the arm controller 9 of the automatic changer 20, as specified by transfer operation t13. On reception of the command type CT-1, the arm controller 9 responds by entraining its own state on the status type ST-1, as specified by transfer operation t14. On reception of the status type ST-1, the check computer 34 confirms that the firmware data has been correctly transmitted, based upon the result RES of the status type ST-1 and the pointers PITM and PITL. If the firmware data transmission is not completed by one operation, the operation of transmission of the command types CT-2 and CT-1, as specified by transfer operations t12 and t13, is performed iteratively.

The reason the check computer 34 does not accept the status type ST-1 from the arm controller 9 immediately after transmission of the firmware data to the arm controller 9 as specified by transfer operation t12 but rather, re-transmits the command type CT-1 to the arm controller 9 as specified by the command type CT-1 and confirms whether or not the firmware data has been correctly transmitted by the status type ST-1 returned from the arm controller 9 responsive to the command type CT-1 is that the timing of returning the status type ST-1 to the check computer 34 is not uniquely determined in case of error occurrence during transmission. That is, if the communication network is in use, communication costs would be prohibitively increased if the communication network is perpetually in circuit despite the fact that the timing of returning the response is not uniquely determined. Thus, if the information exchange time between the check computer 34 and the arm controller 9 is in excess of a pre-set time, the network is transiently disconnected after the end of the above-mentioned transfer operation t12 and re-connected after lapse of a pre-set time and subsequently the command type CT-1 is transmitted to the arm controller 9 as specified by transfer operation t13. This pre-set time may, for example, be set to half an hour or one hour, or a time duration which is not determined unequivocally, and may be pre-set depending upon the charge of the communication network 35 in use. If the processing by the automatic changer 20 is not completed on connection of the network after lapse of the pre-set time, the operation of disconnecting the network and re-connecting the network after lapse of a certain time may be performed repeatedly.

If the check computer 34 views the status type ST-1 from the arm controller 9 from the automatic changer 20 and confirms that transmission of the firmware data has come to a close, the check computer issues a command type CT-4 as indicated by transfer operation t15, and sends the command type to the arm controller 9.

The system controller 41 of the arm controller 9, having accepted the command type CT-4, controls the SIO switcher 46 via the SIO switcher control circuit 47 so that the connection line (RS-232C bus) will be electrically connected to all of the optical disc drives 14 to 17. The system controller 41 then sends the command type CT-2 having the firmware data previously stored in the buffer 48 to all of the optical disc drives 14 to 17 as specified by the transfer operation t16. That is, in the instant embodiment, the firmware data from the arm controller 9 to the optical disc drives 14 to 17 is completed in one parallel operation over the RS-232C buses 26 to 29.

The check computer 34 then transfers the command of the command type CT-1 to the arm controller 9, as specified by transfer operation t17.

On accepting the command type CT-1 from the check computer 34 over the network, the arm controller 9 transmits the command of the command type CT-1 to the optical disc drive 14 as specified by transfer operation t18. On accepting the command, the optical disc drive 14 entrains its own state on the status type ST-1 by way of responding to the arm controller 9. In a similar manner, the arm controller 9 transfers the command of the command type CT-1 to the optical disc drives 15 to 17 as specified by transfer operations t20, t22 and t24. On accepting the command, the optical disc drives 15 to 17 respond to the arm controller 9 by entraining their own current states on the status type ST-1. On accepting the status type ST-1 from the optical disc drives 14 to 17, the arm controller 9 of the automatic changer 20 responds to the check computer 34 by entraining its own state and the states of the optical disc drives 14 to 17 on the status type ST-1 over the network as specified by transfer operations t26 and t27.

The reason the check computer 34 does not accept the status type ST-1 from the arm controller 9 immediately after transmission of the command type CT-4 to the arm controller 9 as specified by transfer operation t15 but rather, re-transmits the command type CT-1 to the arm controller 9 as specified by transfer operation t17 and confirms whether or not the firmware data has been correctly transmitted by the status type ST-1 returned from the arm controller 9 responsive to the second command type CT-1 is that the timing of returning the status type ST-1 from the arm controller 9 to the check computer 34 is not uniquely determined in case of error occurrence during transmission. Thus, the check computer 34 transiently disconnects the network after the end of the above-mentioned transfer operation t15 and re-connects the network after lapse of a pre-set time and subsequently transmits the command type CT-1 to the arm controller 9 as specified by transfer operation t15.

The check computer 34 views the status ST of the status type ST-1 transmitted from the arm controller 9 over the network and, when it has confirmed that the all of the optical discs 14 to 17 are ready, the computer 34 recognizes that the downloading of the firmware to the optical disc drives 14 to 17 has come to a close, and terminates the processing of downloading of the firmware data.

Referring to the communication protocol of FIG. 9, the operation of the recording/reproducing apparatus of the instant embodiment in executing the diagnostic program of the automatic changer 20 and transmitting the results of diagnosis to the check computer 34 over the network is hereinafter explained.

In FIG. 9, the network is connected in circuit, and a command of the command type CT-1 is issued from the check computer 34 as specified by transfer operation t31 shown by the arrow. This command type CT-1 is transmitted over the network to the system controller 41 of the arm controller 9 of the automatic changer for optical discs 20.

On accepting the command of the command type CT-1, the arm controller 9 of the automatic changer for optical discs 20 transfers the command of the command type CT-1 to the optical disc drive 14 (optical disc drive associated with the drive DR#1) as specified by transfer operation t32. On receiving this command, the optical disc drive 14 responds to the arm controller 9 by entraining its own state on the status type ST-1 as specified by transfer operation t33. Similarly, the arm controller 9 transfers the command of the command type CT-1 to the optical disc drives 15 to 17 associated with the drives DR#3 to DR#4, respectively, as specified by transfer operations t34, t36, t38. On receiving the command, the optical disc drives 15 to 17 respond to the arm controller 9 by entraining their own states on the status type ST-1 as specified by transfer operations t35, t37 and t39. On receiving the status type ST-1 from the optical disc drives 14 to 17, the arm controller 9 of the automatic changer for optical discs 20 responds to the check computer 34 by entraining its own state and the states of the optical disc drives 14 to 17 on the status type ST-1 over the network as specified by transfer operations t40 and t41.

The check computer 34 views the status ST of the status type ST-1 transmitted from the automatic changer 20 over the network and, if it has confirmed that the all of the optical discs 14 to 17 are ready such that there is no data exchange with the host computer 11, the check computer sends the command type CT-4 over the network to the arm controller 9 of the automatic changer 20 as specified by transfer operation t42. The device identification number DID in the command type CT-4 is the number 5 designating the drives in their entirety, while the sub-command code SCC specifies the diagnostic program. That is, the check computer 34 issues a command of the command type CT-4 comprised of a command code $CC_{04}$ followed by a device identification number DID specifying the number 5, followed in turn by the sub-command SCC specifying the diagnostic program, as shown in FIG. 4d. This command is transmitted over the network to the arm controller 9.

The system controller 41 of the arm controller 9, which has received the command type CT-4, controls the SIO switcher 46 via the SIO switcher controlling circuit 47, for electrically connecting the line for transmission data TX (RS-232C bus) to all of the optical disc drives 14 to 17, after which the system controller sends out a command of the command type CT-4 to the optical disc drives 14 to 17 as specified by transfer operation t43. That is, the command of the command CT-4 is issued in this case from the arm controller 9 to the optical disc drives 14 to 17 by one parallel operation over the RS-232C buses 26 to 29.

The check computer 34 then re-issues the command type CT-1 to the arm controller 9 of the automatic changer 20 as specified by transfer operation t44.

On reception of the command type CT-1, the arm controller 9 transmits the command of the command type CT-1 to the optical disc drive 14 as specified by transfer operation t45. On reception of this command, the optical disc drive 14 responds to the arm controller 9 by entraining its own state on the status type ST-1 as specified by transfer operation t46. In a similar manner, the arm controller 9 transmits a command of the command type CT-1 to the optical disc drives 15 to 17 as specified by transfer operations t47, t49 and t51. On reception of the command, the optical disc drives 15 to 17 respond to the arm controller 9 by entraining their own states on the status type ST-1 as specified by transfer operations t48, t50, t52 and t53.

The check computer 34 views the status ST of the status type ST-1 transmitted from the arm controller 9 over the network and, when it has confirmed that all of the optical discs 14 to 17 are ready, the computer 34 recognizes that execution of the diagnostic program for all of the optical disc drives 14 to 17 has come to a close.

On recognition that the execution of the diagnostic program of the optical disc drives 14 to 17 has come to a close, the arm controller 9 transfers the command type CT-3 to the optical disc drive 14, as specified by transfer operation t54. On reception of the command, the optical disc drive 14 responds to the arm controller 9 by entraining the results of execution of the diagnostic program as specified by transfer operation t55. Similarly, on reception of the command of the command type CT-3, the optical disc drives 15 to 17 respond to the arm controller 9 by entraining the results of execution of the diagnostic program by the optical disc drives 15 to 17 on the status type ST-2. Meanwhile, the transfer operations t56 and t57 represent the transfer between the arm controller 9 and the optical disc drive 17.

The arm controller 9 causes the results of execution of the diagnostic program transmitted along with the status type ST-1 from the optical disc drives 14 to 17 to be stored transiently in the buffer 48.

The check computer 34 then causes the command type CT-1 to be transmitted again over the network to the arm controller 9 of the automatic changer 20 by transfer operation t58. On reception of the command, the arm controller 9 returns the status type ST-1 to the check computer 34 as specified by transfer operation t59. On confirming by the result RES of the status type ST-1 from the arm controller 9 that the diagnostic command has been normally completed, the check computer 34 transmits the command type CT-3 to the arm controller 9 over the network as specified by transfer operation t60. On reception of the command type CT-3, the arm controller 9 responds to the check computer 34 by entraining data of the results of execution of the diagnostic program stored in the buffer 48 on the status type ST-1 as specified by transfer operation t61 and transfers the data to the check computer 34.

The reason the check computer 34 does not accept the status type ST-1 from the arm controller 9 immediately after transmission of the command type CT-4 to the arm controller 9 as specified by the transfer operation t42 but rather, re-transmits the command type CT-1 to the arm controller 9 as specified by the command type t58 and receives the data of the results of execution of the diagnostic program by the status type ST-1 returned from the arm controller 9 responsive to the second command type CT-1, is that there are occasions wherein, depending upon the type of the commands, it takes several hours until the results of execution of the diagnostic program are obtained, such that the response time is not determined unequivocally. If the communication network is perpetually connected in circuit despite the fact that the timing of returning the response is not determined unequivocally, the communication costs become prohibitive. Therefore, the check computer 34 disconnects the network transiently after the transfer operations t42 and t44 and re-connects the network in order to send the command type CT-1 as indicated by the transfer operation t58 to the arm controller 9.

The foregoing description has been directed to downloading of firmware data for the optical disc drives 14 to 17 of the automatic changer 20, and the execution of the diagnostic program as well as the response to the results of execution by remote control operation of the check computer 34 over the network. In addition, by reading out data stored in the backup RAM 49 in the arm controller 9 of the automatic changer 20 by the check computer 34 by the remote operation in accordance with the communication protocol over the network, it becomes possible for the check computer 34 to comprehend the operating state or time of the automatic changer for optical discs 20 and the optical disc drives 14 to 17 and hence to realize the correct maintenance time and maintenance parts.

It is desirable in the recording/reproducing apparatus of the instant embodiment that the automatic changer for optical discs 20 and the modem 32 be connected to each other on installing the automatic changer for optical discs 20. Usually, such connection occurs for the first time on occurrence of problems. Thus, in the automatic changer for optical discs 20 of the instant embodiment, an interrupt signal is supplied over RS-232C bus 31 from the check computer 34 to the system controller 41 when the line for the transmission permission status line (CTS line) included in the RS-232C bus 31 has become active.

Figure 10:
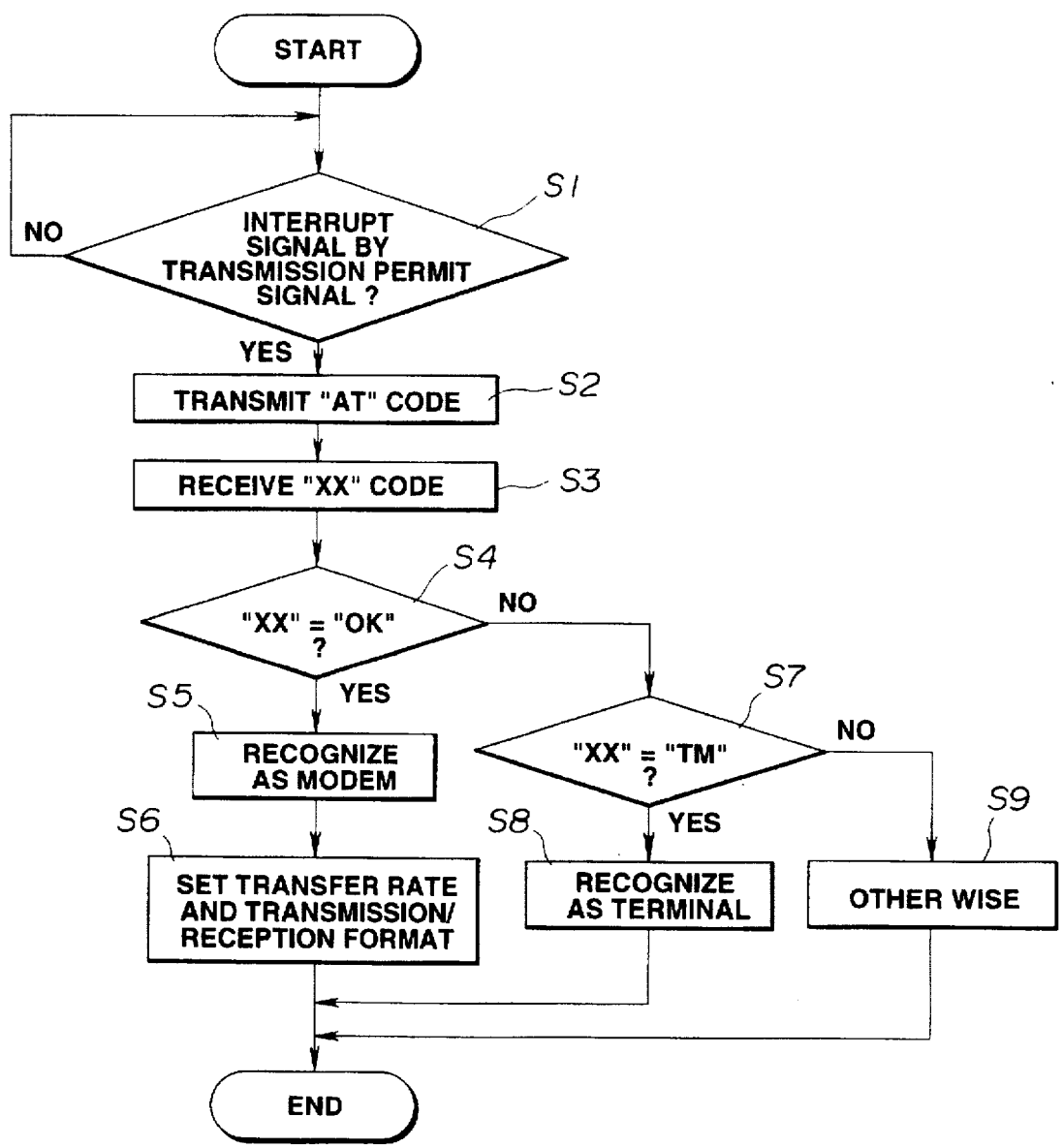
FIG. 10 is a flowchart for illustrating the automatic modem/terminal recognition protocol.

It should be noted that the system controller 41 recognizes the connection of the modem or the terminal computer by a recognition protocol shown for example in FIG. 10. The terminal computer herein means a computer having a function comparable to that of the host computer 11 and which is connected to the automatic changer for optical discs 20 by an RS-232C interface instead of by an SCSI interface. It should be noted that, if the interrupt signal has been entered to the system controller 41 but the communication protocol of FIGS. 7 or 8 has not been achieved, the system controller recognizes that, instead of the modem, the terminal computer has now been connected.

In FIG. 9, it is judged by the system controller 41 at step S1 whether or not there is any interrupt signal by the transmission permission status (CTS). If it is determined that there is no such interrupt signal, the processing of step S1 is repeated. During this time, a different operation is performed. If it is determined that there is such interrupt signal, processing transfers to step S2. If the line for transmission permission status is active, the system controller 41 transmits an active command code AT via RS-232C bus to a modem. On reception of a response code XX from, for example, a modem at step S3, it is judged at step S4 whether or not the response code XX is a code OK specifying the modem. If the result of judgment at step S4 is YES, processing transfers to step S5 where it is recognized that the modem has been connected. At the next step S6, the transfer rate to the modem and the transmission/reception format are set. If the result of judgment at step S4 is NO, processing transfers to step S7 where it is judged whether or not the code XX is a code TM specifying a terminal computer. If the result of judgment at step S7 is YES, it is recognized that the terminal computer has now been connected. If the result of judgment at step S7 is NO, processing transfers to step S9 where it is recognized that neither modem nor terminal computer has been connected.

In addition, the recording/reproducing apparatus of the present invention is configured so that transmission/reception of the commands and statuses between the automatic changer 20 and the check computer 34 is possible and all commands employed by the host computer 11 can be executed by the check computer 34. The recording/reproducing apparatus of the present invention is also configured so that the commands from the check computer 34 can be executed by the automatic changer for optical discs 20 without interrupting the interconnection between the host computer 11 and the automatic changer for optical discs 20. Thus, with the recording/reproducing apparatus of the instant embodiment, data may be read out from or written in the optical disc D in each of the optical disc drives 14 to 17 in the automatic changer for optical discs 20 over the RS-232C buses 26 to 29 without regard to connection to the host computer 11.

Meanwhile, the interface data transfer rate by the RS-232C standard is rather slow as compared to that by the SCSI standard. If the RS-232C standard interface is used, and the international network, for example, is employed as a communication network 35, it takes much time and cost to receive data of results of the diagnostic command or download program data, such as firmware as described previously, over the international network.

Thus, with the present embodiment, transmission/reception of data such as data specifying the results of diagnostic commands or the firmware data can be compressed by the system controller 41 of, for example, the arm controller 9 in the automatic changer for optical discs 20 having the ROM 36 containing a software for data compression/expansion, thus enabling the network utilization time to be reduced. As the data compression system, a variable length encoding system, such as Huffman encoding, may be employed.

The recording/reproducing apparatus of the instant embodiment includes optical discs 14 to 17, as means for recording/reproducing signals on or from a recording medium, an arm controller 19, also operating as recognition means for recognizing the state of the recording/reproducing means, RS-232C buses 26 to 29, as first interfacing means for exchanging the information between the optical disc drives 14 to 17 and the arm controller 9, an SCSI bus 21, as second interfacing means for exchanging the commands and statuses between the arm controller 9 and a host computer 11 as a first external equipment, and the RS-232C bus 31, modem 32, communication network 35 and modem 33, as third interfacing means, separate from the second interfacing means, for exchanging the commands and statuses between the arm controller 9 and a check computer 34 as a second external equipment. The exchange of the information is done between the arm controller 9 and the check computer 34 by the third interfacing means as the connection between the arm controller 9 and the host computer 11 by the second interfacing means is maintained.

Thus, with the recording/reproducing apparatus of the instant embodiment, software downloading or problems can be resolved without disconnecting the host computer and the automatic changer for optical discs 20 from each other. Also, with the instant embodiment, it is possible for the check computer 34 to acquire the information on, for example, the maintenance time, from remote places without disconnecting the automatic changer for optical discs 20 and the host computer 11 from each other.

In addition, with the automatic changer for optical discs 20, command issuance and software downloading can be executed simultaneously for the plural optical disc drives loaded on the automatic changer for optical discs 20, so that not only costs in communication network can be diminished but also the user problems can be coped with in shorter time.

The above description of the preferred embodiments has been made with reference to an optical disc as a recording medium that is both recordable and reproducible. However, such optical disc may also be a play-only disc, such as a compact disc, or a write-once disc. In addition, it may also be a magneto-optical disc or a phase-transition type optical disc. The recording medium may be also be a tape-shaped recording medium, such as a video tape, audio tape or a data-recording tape, in addition to a disc-shaped recording medium, such as a hard disc or a flexible disc. If the tape-shaped recording medium is employed, the drive anged within the automatic changer is modified to be used with the tape-shaped recording medium.

The data to be exchanged between the check computer 34 and automatic changer for optical discs 20 via the network may also be data read out from the optical disc D or data recorded the optical disc D, in addition to the above-mentioned remands, status or firmware program data. In such case, data recorded on the optical disc D can be entrained on, for example, the command type CT-2 so as to be sent from the check computer 34 via a network to an optical disc drive within the automatic changer for optical discs 20, while data reproduced from the optical disc D is entrained on, for example, the status type ST-2 so as to be supplied via a network to the check computer 34.

What is claimed is:

1. A recording/reproducing apparatus comprising:
   means for recording/reproducing signals on or from a recording medium;
   recognition means for recognizing the state of said recording/reproducing means;
   first interfacing means for exchanging information between said recording/reproducing means and said recognition means;
   second interfacing means for exchanging the information between said recognition means and a first external equipment; and
   third interfacing means for exchanging the information between said recognition means and a second external equipment;
   wherein the exchange of the information is performed between said recognition means and said second external equipment by said third interfacing means as the connection between the recognition means and the first external equipment by said second interfacing means is maintained.

2. The recording/reproducing apparatus as claimed in claim 1 further comprising transmission information storage means for transiently storing the information exchanged between the recognition means and the first external equipment and the information exchanged between the recognition means and the second external equipment.

3. The recording/reproducing apparatus as claimed in claim 1 wherein said third interfacing means employs a modem and a communication network.

4. The recording/reproducing apparatus as claimed in claim 1 further comprising:
   first holding means for holding plural recording media;
   second holding means for holding plural recording/reproducing means; and
   transporting means for taking out one of the recording media from said first holding means based upon a control signal transmitted via said second or third interfacing means for transporting said recording medium to one of the recording/reproducing means in said second holding means.

5. The recording/reproducing apparatus as claimed in claim 4 wherein said recognition means has holding means for holding operation process information of each recording/ reproducing means and operation process information of said transporting means.

6. The recording/reproducing apparatus as claimed in claim 1 wherein said recognition means has holding means for holding operation process information of said recording/reproducing means.

7. The recording/reproducing apparatus as claimed in claim 1 further comprising compression means for compressing the information transmitted to said second external equipment by said third interfacing means; and expansion means for expanding the compressed information transmitted via said third interfacing means from said second external equipment.

8. A recording/reproducing apparatus comprising:

means for recording/reproducing signals on or from a recording medium;

recognition means for recognizing the state of said recording/reproducing means;

first interfacing means for exchanging information between said recording/reproducing means and said recognition means;

second interfacing means for exchanging the information between said recognition means and a first external equipment; and third interfacing means for exchanging the information between said recognition means and a second external equipment;

first holding means for holding plural recording media;

second holding means for holding plural recording/reproducing means; and transporting means for taking out one of the recording media from said first holding means based upon a control signal transmitted via said second or third interfacing means for transporting said recording medium to one of the recording/reproducing means in said second holding means wherein the exchange of the information is performed between said recognition means and said second external equipment by said third interfacing means as the connection between the recognition means and the first external equipment by said second interfacing means is maintained; and wherein said first interfacing means has connection means for simultaneously exchanging the information with plural recording/reproducing means.

9. The recording/reproducing apparatus as claimed in claim 8 further comprising:

compression means for compressing the information transmitted to said second external equipment by said third interfacing means; and expansion means for expanding the compressed information transmitted via said third interfacing means from said second external equipment.

10. A recording/reproducing apparatus comprising:

means for recording/reproducing signals on or from a recording medium;

recognition means for recognizing the state of said recording/reproducing means;

first interfacing means for exchanging information between said recording/reproducing means and said recognition means;

second interfacing means for exchanging the information between said recognition means and a first external equipment; and third interfacing means for exchanging the information between said recognition means and a second external equipment;

wherein the exchange of the information is performed between said recognition means and said second external equipment by said third interfacing means as the connection between the recognition means and the first external equipment by said second interfacing means is maintained;

wherein said third interfacing means employs a modem and a communication network; and further wherein, if more than a pre-set time is required for information exchange between the second external equipment and the recognition means, the connection of said communication network is interrupted after information transmission or reception and is continued at pre-set time intervals.

11. The recording/reproducing apparatus as claimed in claim 10 further comprising:

compression means for compressing the information transmitted to said second external equipment by said third interfacing means; and expansion means for expanding the compressed information transmitted via said third interfacing means from said second external equipment.

12. A recording/reproducing apparatus comprising:

means for recording/reproducing signals on or from a recording medium;

recognition means for recognizing the state of said recording/reproducing means;

first interfacing means for exchanging information between said recording/reproducing means and said recognition means;

second interfacing means for exchanging the information between said recognition means and a first external equipment; and third interfacing means for exchanging the information between said recognition means and a second external equipment;

wherein the exchange of the information is performed between said recognition means and said second external equipment by said third interfacing means as the connection between the recognition means and the first external equipment by said second interfacing means is maintained;

wherein said third interfacing means employs a modem and a communication network; and further wherein said third interfacing means includes discrimination means for discriminating which of a mode or a terminal has been connected.

13. The recording/reproducing apparatus as claimed in claim 12 further comprising:

compression means for compressing the information transmitted to said second external equipment by said third interfacing means; and expansion means for expanding the compressed information transmitted via said third interfacing means from said second external equipment.

* * * * *